(12) United States Patent
Liu et al.

(10) Patent No.: US 11,280,601 B2
(45) Date of Patent: Mar. 22, 2022

(54) INSPECTION TOOL FOR SURFACE OF PAINT

(71) Applicant: CITIC Dicastal Co., Ltd., Qinhuangdao (CN)

(72) Inventors: Xiao Liu, Qinhuangdao (CN); Lijie Hu, Qinhuangdao (CN); Yingjie Wang, Qinhuangdao (CN)

(73) Assignee: CITIC Dicastal CO., LTD., Hebei (CN)

( * ) Notice: Subject to any disclaimer, the term of this patent is extended or adjusted under 35 U.S.C. 154(b) by 2 days.

(21) Appl. No.: 17/102,314

(22) Filed: Nov. 23, 2020

(65) Prior Publication Data

US 2021/0156661 A1 May 27, 2021

(30) Foreign Application Priority Data

Nov. 25, 2019 (CN) .......................... 201911161782.6

(51) Int. Cl.
*G01B 3/50* (2006.01)
*G01B 5/00* (2006.01)

(52) U.S. Cl.
CPC ............. *G01B 5/0002* (2013.01); *G01B 3/50* (2013.01)

(58) Field of Classification Search
CPC ................................ G01B 5/0002; G01B 3/50
USPC ........................................ 33/542, 543, 555.1
See application file for complete search history.

(56) References Cited

U.S. PATENT DOCUMENTS

| | | | | |
|---|---|---|---|---|
| 5,979,071 A | * | 11/1999 | Kim ......................... | G01B 3/50 33/605 |
| 7,251,901 B2 | * | 8/2007 | Heavens ................... | G01B 3/46 33/542 |
| 7,913,411 B2 | * | 3/2011 | Klepp ....................... | G01B 3/26 33/544.5 |
| 8,365,428 B2 | * | 2/2013 | Miller ....................... | G01B 7/26 33/542 |
| 10,982,943 B1 | * | 4/2021 | Meyer ....................... | G01B 3/50 |
| 2009/0249635 A1 | * | 10/2009 | Tsai ........................... | G01B 5/12 33/542 |
| 2021/0123713 A1 | * | 4/2021 | Burton ...................... | G01B 3/46 |

\* cited by examiner

*Primary Examiner* — George B Bennett

(57) ABSTRACT

The present invention discloses an inspection tool for surface of paint that is capable of detecting if a diameter of the minimum surface without paint of a mounting surface of a bolt hole is qualified, and if a height of surface without paint of side wall of a bolt hole as a counter hole exceeds a given range. The present invention is of simple structure and is convenient for use.

9 Claims, 5 Drawing Sheets

INSPECTION TOOL FOR SURFACE OF PAINT

TECHNICAL FIELD

The invention relates to a technical field of an inspection tool, in particular an inspection tool for surface of paint.

BACKGROUND

After machining and before entering a spraying process, a mounting plane of a bolt hole and a center hole of a hub are not allowed to be covered by a paint film. Therefore, it is necessary to use a protection to protect positions where the paint film is not allowed. The hub, which has been sprayed, is required to be inspected if there is a paint film covering the mounting plane of the bolt hole and surface of the center hole. As to inner cylindrical surface of the center hole, it can be visually inspected if there is the paint film. As to positions outside a circumference of the mounting plane of the bolt hole, it is inevitable for paint splashing there. As a result, a diameter of the minimum surface without paint will be required. As to positions on side wall of the bolt hole as a counter hole, height of surface without paint will not be allowed to exceed a given range. However, at present, there is no relatively accurate and convenient way of inspection for the diameter of the minimum surface without paint and the height of surface without paint of the side wall at positions of the bolt hole.

SUMMARY

In view of this, an aim of the present invention is to propose an inspection tool for surface of paint that solves a problem that it is not easy to measure if a range of surface with paint is qualified at present stage.

In order to achieve the aim, a technical scheme of the invention is realized as follows:

A inspection tool for surface of paint comprises a positioning column and a limiting disc, wherein an elastic member is arranged between an upper surface of the positioning column and a lower surface of the positioning plate, with limiting pins fixed to the upper surface of the positioning column vertically upward, wherein the limiting disc is inserted through by the limiting pins and moves within a vertical extent defined by the limiting pins.

In one embodiment, grooves are provided in corresponding positions of each outer circumference of the positioning column and the limiting disc.

In one embodiment, the limit pins include T-type limit pins, and the upper surface of the positioning column is fixedly connected to lower ends of the T-type limit pin.

In one embodiment, at least two blind holes are uniformly arranged in the upper surface of the positioning column, the lower ends of the T-shaped limit pins are fixedly installed into the blind holes, through holes are provided in positions of the limit disc corresponding to the blind holes, and the T-shaped hunting pins are inserted through the through holes and connected with the through holes under clearance fit.

In one embodiment, exhaust holes are provided in bottoms of the blind holes as through holes and the lower ends of the T-shaped limiting pins are inserted into the blind holes under interference fit.

In one embodiment, four blind holes are uniformly arranged in the upper surface of the positioning column.

In one embodiment, the grooves are provided along ¼ of each outer circumference of the positioning column and the limiting disc.

In one embodiment, the elastic part includes a spring.

In one embodiment, the T-shaped pins are connected with the through hole under a fit of clearance of 0.05 mm.

Compared with the prior art, the paintwork inspection tool provided by the invention are of the following advantages:

The present invention can be used to detest whether diameter of the minimum surface without paint of the mounting of the bolt hole is qualified, and the height of the surface without paint of the side wall of the bolt hole as a counter hole exceeds the given range. The present invention is of simple structure and low cost, is convenient to use, and solves the problem that it is difficult to measure if the surface of pain is qualified.

BRIEF DESCRIPTION OF FIGURES

The accompanying drawings, which comprise a portion of the specification, are included to provide a further understanding of the invention, and illustrative embodiments of the invention together with the description serve to explain the invention and do not constitute an unsuitable limitation of the invention. In the drawings.

DESCRIPTION OF REFERENCE NUMERALS

1—positioning column, 2—exhaust hole, 3—spring, 4—guiding and limiting pin, 5—upper limiting disc, 6—through hole, 7—blind hole, and 8—groove

DETAILED DESCRIPTION

It should be noted that embodiments of the present disclosure and features of the embodiments may be combined with one another without conflict.

The technical solution of the present disclosure will be described clearly and completely hereinafter with reference to the accompanying drawings and in combination with embodiments, and obviously, the embodiments described are only a part of embodiments of the present disclosure, and are not all of embodiments thereof. Based on the embodiments of the present disclosure, all other embodiments obtained by a person with ordinary skill in the art without involving any inventive effort fall within the protection scope of the present disclosure.

An inspection tool for surface of paint of an embodiment of the present invention is described below in conjunction with an embodiment with reference to FIGS. 1-5.

Figure 1:
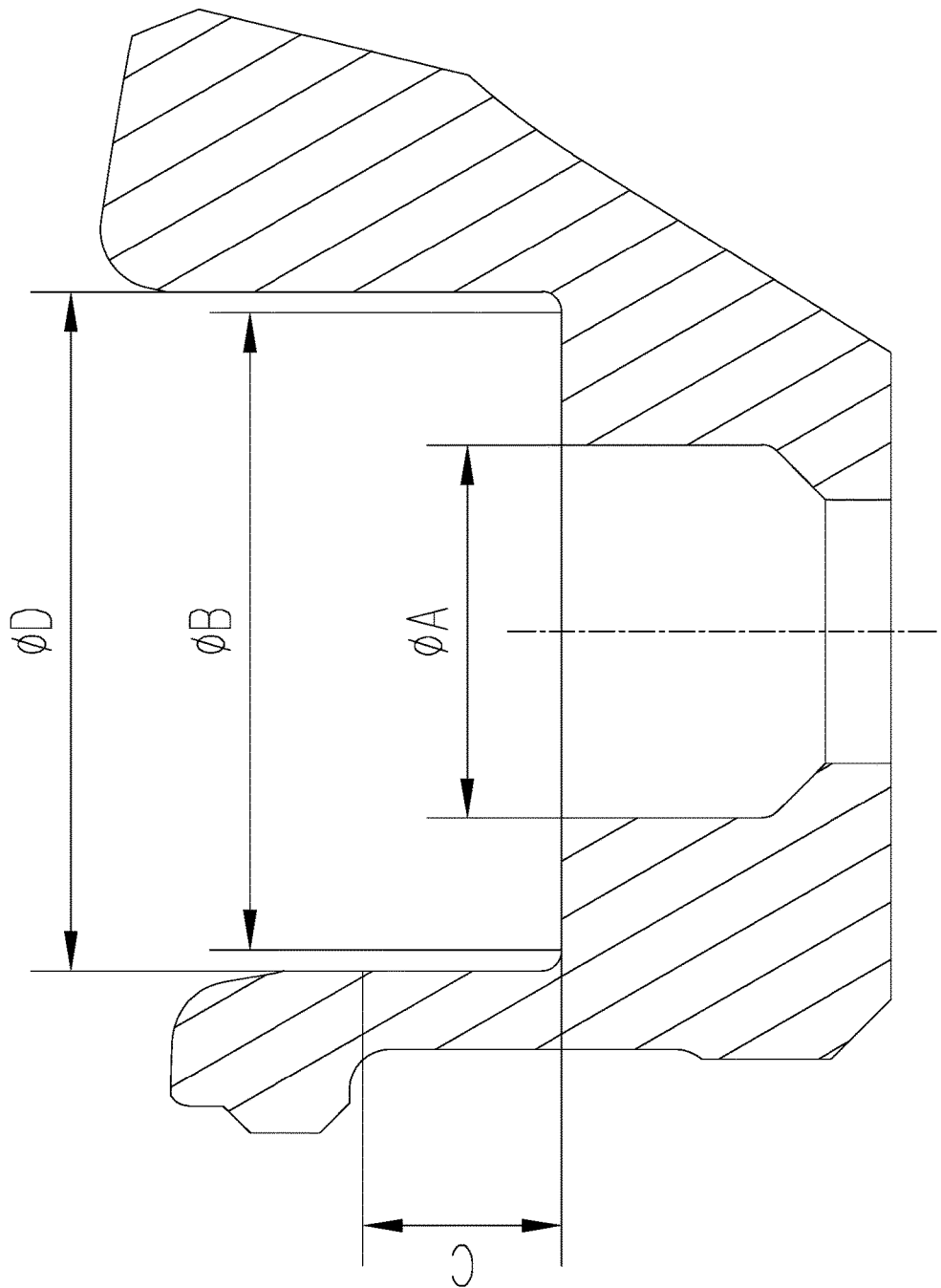
FIG. 1 is a cross-sectional view of a bolt hole measured by an inspection tool for surface of paint of the present invention.
Figure 2:
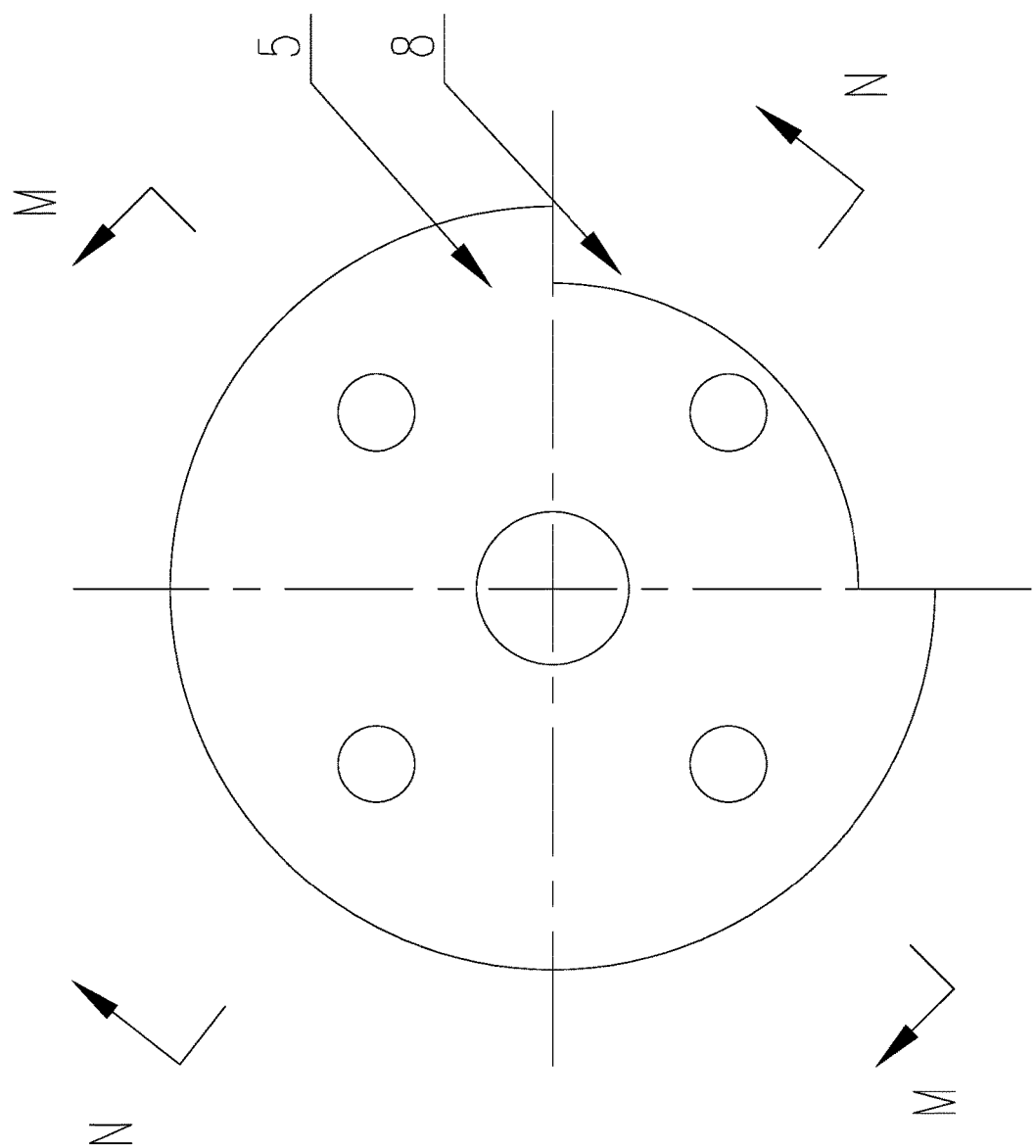
FIG. 2 is a too view of the inspection tool for surface of paint of the present invention.
Figure 3:
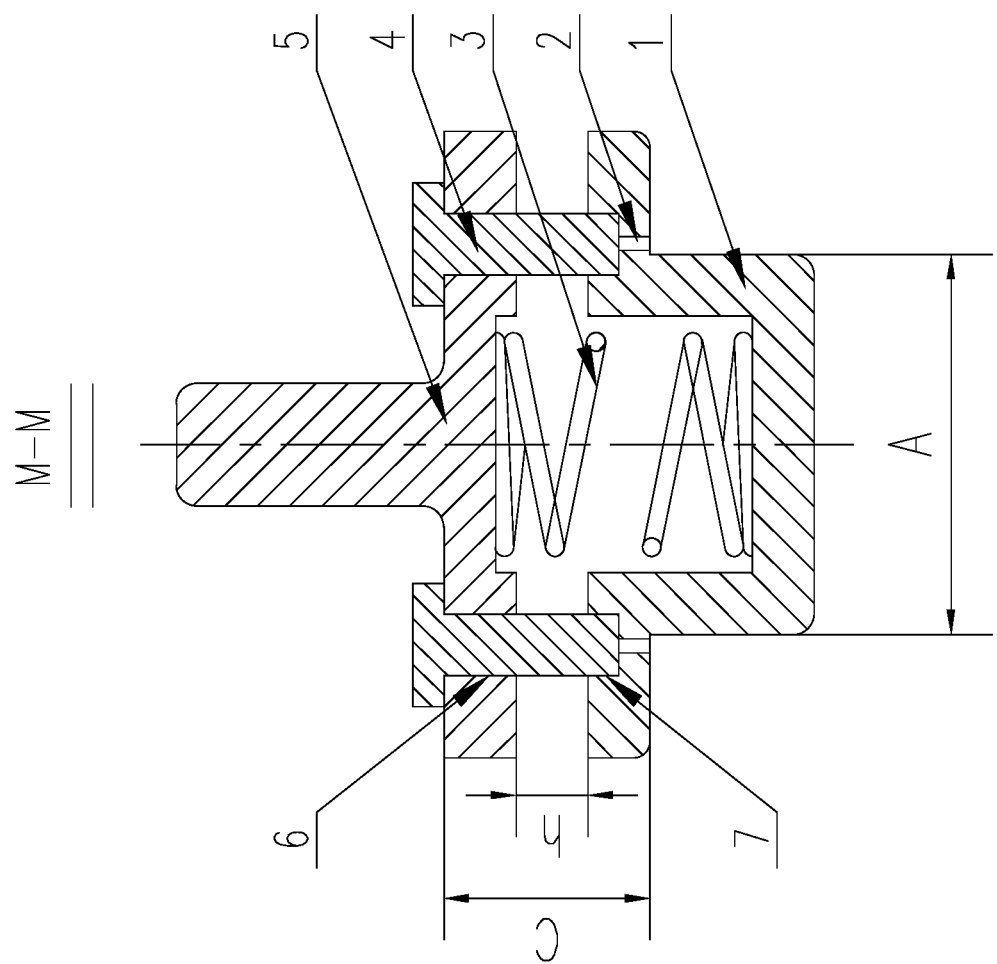
FIG. 3 is a cross-sectional view taken at M-M of the inspection tool for surface of paint of the present invention.
Figure 4:
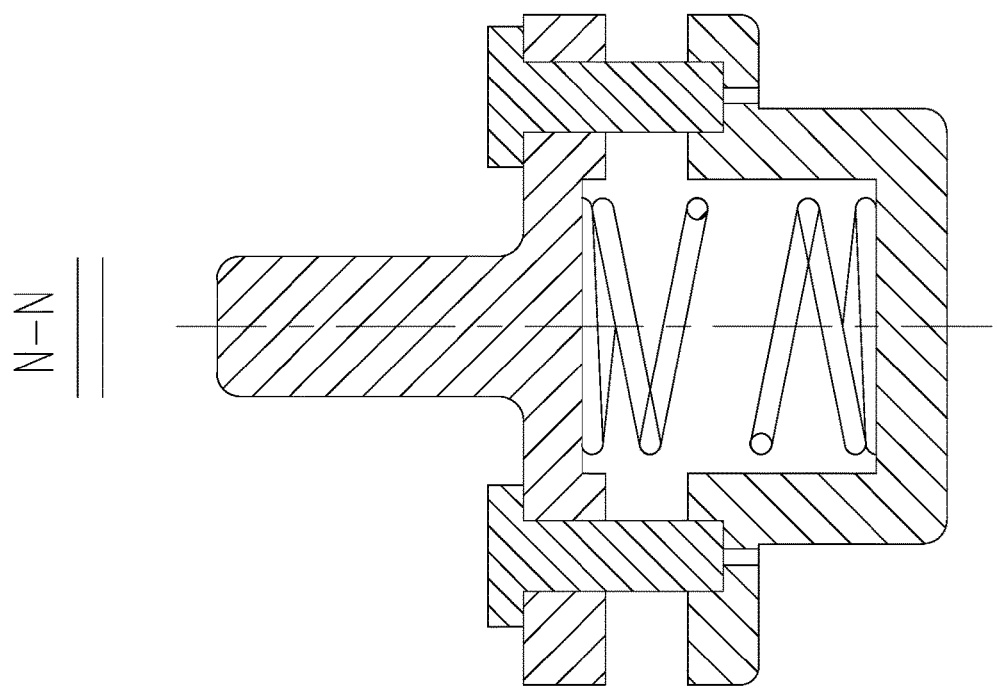
FIG. 4 is a cross-sectional view taken at N-N of the inspection tool for surface of paint of the present invention.
Figure 5:
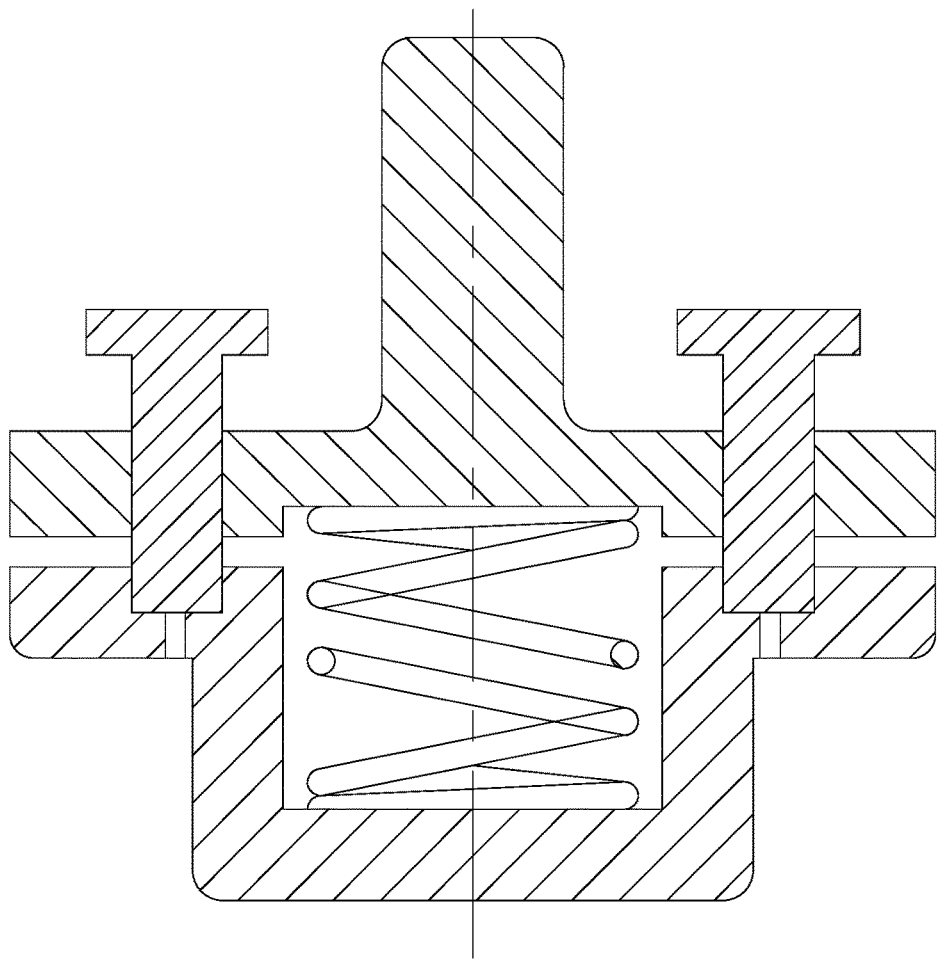
FIG. 5 is a cross-sectional view of the inspection tool for surface of paint of the present invention at a middle stroke.

In some embodiments, as shown in FIGS. 2 and 3, the inspection tool includes a positioning column 1, on upper surface of which four blind holes 7 are evenly arranged, an exhaust hole 2 arranged at bottom of each of the four blind holes 7, a upper limiting disc 5, on which four through holes 6 are evenly arranged, a guiding and limiting pin 4, which passes through one of the through holes 6 and goes deep into one of the blind holes 7 till contacting with bottom of the hole a spring 3 mounted in a space formed between upper end surface of the positioning column 1 and lower end surface of the upper limiting disc 5, and a groove 8 provided at same position on each circumference of the upper limiting disc 5 and the upper end face of the positioning column 1 of one quarter of the each circumference.

During use, the inspection tool for the minimum surface without paint of the present invention is put into the bolt hole, with the lower end of the positioning column of site A inserted deep into the bolt hole, so that the inspection tool is positioned in the bolt hole radially and axially. When an upper end of the inspection tool is in free state with no force applied thereto, the upper limiting disc 5 is lifted to the highest position by the spring 3 and is in contact with the upper end of the guiding and limiting pin 4. Then the upper end of the upper limiting disc 5 is gently pressed down by hand, and the height of surface without paint on side wall of the bolt hole is carefully observed to inspect whether it exceeds upper surface of outer cylindrical surface of the upper limiting disc 5 when the inspection tool is in the free state. If it exceeds this surface, the minimum surface without paint will be determined to be unqualified, and if it does not exceed this surface, the minimum surface without paint will be determined to be qualified. After that, the inspection tool is rotated gently, and inside of the groove 8 at each outer circumference of the upper end surface of the position column 1 and the upper limiting disc 5 is carefully observed to inspect whether there is paint. If there is paint, the minimum surface without paint will be determined to be unqualified, and if there is no paint, the minimum surface without paint will be determined to be qualified.

In some embodiments, the guiding and limiting pins 4 are connected with the through holes 6 on the upper limiting disc 5 under clearance fit with set clearance of 0.05 mm. Tolerance of cylindrical dimension A of the lower end of the positioning column 1 is set with an upper difference of 0 and a lower difference of 0.2 mm.

In some embodiments, the guiding and limiting pin 4 is connected with the blind hole 7 of the positioning column 1 under an interferences fit, so that the guiding and limiting pin 4 can limit the upper limit position of the upper limiting disc 5 at head of the upper end of the guiding and limiting pin 4, which ensures the inspection tool of the present invention is of a one-piece structure, rather than of a structure with discrete and individual parts.

In some embodiments, during a process of the guiding and limiting pin 4 being installed into the bottom of the blind hole 7 on the positioning column 1, the exhaust hole 2 on the positioning column 1 can ensure discharge of gas of the space between the lower end surface of the guiding and limiting pin 4 and bottom surface of the blind hole 7, so as to ensure the lower end surface of the guiding and limiting pin 4 is in contact with the bottom surface of blind hole 7. Finally, effect of the interference fit between the guiding and limiting pin 4 and blind hole 7 is ensured.

In some embodiments, the upper limiting disc 5 can be lifted off to the position at the maximum distance from the positioning column 1 by the spring 3 under the guidance of the guiding and limiting pin 4.

Compared with the prior art, the inspection tool for paint on surface of the present invention is of the following advantages:

The invention can be used to detect whether the diameter of the minimum surface without paint of the mounting plane of the bolt hole is qualified, and whether the height of the surface without paint on the side wall of the bolt hole as a counter hole exceeds the given range. The invention is of simple structure and low cost, is convenient for use, and solves a problem that it is difficult to measure if the range of surface of paint is qualified.

In the description of the invention, it needs to be understood that the orientation or position relationship indicated by the terms "center", "longitudinal", "transverse", "front", "back", "left", "right", "vertical", "horizontal", "top", "bottom", "inside" and "outside" are based on the orientation or position relationship shown in the drawings, which is only for the convenience of describing the invention and simplifying the description, rather than indicating or implying that the device or element in question must have a specific orientation, be constructed and operated for a specific orientation, and therefore should not be understood as a restriction on the protection contents of the present invention.

In addition, the terms "first" and "second" are used only for the purpose of description and cannot be understood as indicating or implying relative importance or implicitly indicating the number of technical features indicated. Thus, the features defined as "first" and "second" may explicitly or implicitly include one or more of the features, in the description of the present invention. "multiple" means at least two, such as two, three, etc., unless otherwise specifically defined.

In the present invention, unless otherwise specified and defined, the terms "installation", "connection", "connecting", "fixation" and other terms shall be understood in a broad sense. For example, they can be fixed connection, detachable connection, or integration; they can be mechanical connection, electrical connection or mutual communication; they can be directly connected or indirectly connected through an intermediate media, and can be the internal connection of two components or the interaction between two elements. For those of ordinary skill in the art, the specific meaning of the above terms in the invention can be understood according to the specific situation.

The above is only about better embodiments of the invention, and is not used to limit the invention. Any modification, equivalent replacement, improvement, etc. made within the spirit and principle of the invention shall be included in the protection scope of the invention.

What is claimed is:

1. An inspection tool for surface of paint, comprising: a positioning column and a limiting disc, wherein an elastic part is arranged between an upper surface of the positioning column and a lower surface of the limiting disc, with limiting pins fixed to the upper surface of the positioning column vertically upward, wherein the limiting disc is inserted through by the limiting pins and moves within a vertical range defined by the limiting pins.

2. The inspection tool for surface of paint according to claim 1, wherein grooves are provided in corresponding positions of each outer circumference of the positioning column and the limiting disc.

3. The inspection tool for surface of paint according to claim 1, wherein the limiting pins include T-shaped limiting pins, and the upper surface of the positioning column is fixedly connected to lower ends of the T-shaped limiting pins.

4. The inspection tool for surface of paint according to claim 3, wherein at least two blind holes are uniformly arranged in the upper surface of the positioning column, the lower ends of the T-shaped limiting pins are fixedly installed into the blind holes, through holes are provided in positions of the limiting disc corresponding to the blind holes, and the T-shaped limiting pins are inserted through the through holes and connected with the through holes under clearance fit.

5. The inspection tool for surface of paint according to claim 4, wherein exhaust holes are provided in bottoms of the blind holes as through holes, and the lower ends of the T-shaped limiting pins are inserted into the blind holes under interference fit.

6. The inspection tool for surface of paint according to claim 5, wherein four blind holes are uniformly arranged in the upper surface of the positioning column.

7. The inspection tool for surface of paint according to claim 2, wherein the grooves are provided along ¼ of each outer circumference of the positioning column and the limiting disc.

8. The inspection tool for surface of paint according to claim 1, wherein the elastic part includes a spring.

9. The inspection tool for surface of paint according to claim 4, wherein the T-shaped limiting pins are connected with the through holes under a fit clearance of 0.05 mm.

* * * * *